United States Patent
Asakura et al.

(10) Patent No.: US 9,206,844 B2
(45) Date of Patent: Dec. 8, 2015

(54) SLIDE MEMBER AND METHOD OF MANUFACTURING SLIDE MEMBER

(71) Applicant: DAIDO METAL COMPANY LTD., Nagoya-shi, Aichi-ken (JP)

(72) Inventors: Hiroyuki Asakura, Inuyama (JP); Mikihito Yasui, Inuyama (JP); Shigeya Haneda, Inuyama (JP)

(73) Assignee: DAIDO METAL COMPANY LTD., Nagoya-Shi, Aichi (JP)

( * ) Notice: Subject to any disclaimer, the term of this patent is extended or adjusted under 35 U.S.C. 154(b) by 0 days.

(21) Appl. No.: 14/224,460

(22) Filed: Mar. 25, 2014

(65) Prior Publication Data
US 2014/0287253 A1    Sep. 25, 2014

(30) Foreign Application Priority Data

Mar. 25, 2013 (JP) .................................. 2013-061950

(51) Int. Cl.
| | |
|---|---|
| *B32B 9/00* | (2006.01) |
| *F16C 33/24* | (2006.01) |
| *F16C 33/12* | (2006.01) |
| *C23C 8/42* | (2006.01) |
| *C23C 28/04* | (2006.01) |
| *C23C 28/00* | (2006.01) |

(52) U.S. Cl.
CPC . *F16C 33/24* (2013.01); *C23C 8/42* (2013.01); *C23C 28/044* (2013.01); *C23C 28/048* (2013.01); *C23C 28/321* (2013.01); *C23C 28/345* (2013.01); *C23C 28/347* (2013.01); *C23C 28/36* (2013.01); *F16C 33/124* (2013.01); *F16C 2204/36* (2013.01)

(58) Field of Classification Search
None
See application file for complete search history.

(56) References Cited

U.S. PATENT DOCUMENTS

| | | | | |
|---|---|---|---|---|
| 5,171,645 | A * | 12/1992 | Khandkar | 429/442 |
| 6,309,759 | B1 * | 10/2001 | Tomikawa et al. | 428/642 |
| 7,543,992 | B2 * | 6/2009 | Bruce et al. | 384/209 |
| 7,651,784 | B2 * | 1/2010 | Rumpf | 428/642 |

(Continued)

FOREIGN PATENT DOCUMENTS

| | | |
|---|---|---|
| EP | 1 717 462 | 11/2006 |
| EP | 2 031 260 | 3/2009 |

(Continued)

OTHER PUBLICATIONS

Sammes et al. "Bismuth Based Oxide Electrolytes—Structure and Ionic Conductivity", 1999, J. Eur. Ceram. Soc., vol. 19, pp. 1801-1826.*

(Continued)

*Primary Examiner* — David Sample
*Assistant Examiner* — Seth Dumbris
(74) *Attorney, Agent, or Firm* — Browdy and Neimark, PLLC

(57) ABSTRACT

A slide member provided with an overlay composed of a Bi-based material. A slide member includes a substrate; and an overlay including Bi or a Bi alloy provided over the substrate. A surface portion (surface-most portion) of the overlay includes an oxide layer in which a bismuth oxide, is scattered. The content of the bismuth oxide in the oxide layer represented by oxygen content is equal to or greater than 0.5% mass % and equal to or less than 8.0 mass %. The orientation intensity ratio of the main orientation plane of Bi or Bi alloy crystals in the overlay is 50% or greater. The main orientation plane of the bismuth oxide crystals in the oxide layer is the (220) plane or the (201) plane.

3 Claims, 2 Drawing Sheets

(56) References Cited

U.S. PATENT DOCUMENTS

| | | |
|---|---|---|
| 2006/0245676 A1 | 11/2006 | Bruce et al. |
| 2007/0154128 A1* | 7/2007 | Mikami .................. 384/627 |
| 2010/0021097 A1* | 1/2010 | Uchida et al. .............. 384/492 |
| 2011/0142381 A1* | 6/2011 | Zidar ........................ 384/26 |

FOREIGN PATENT DOCUMENTS

| | | |
|---|---|---|
| EP | 2239345 A1 | 10/2010 |
| GB | 2509164 A | 6/2014 |
| JP | H11-050296 A | 2/1999 |
| JP | 2001-020955 A | 1/2001 |
| JP | 2003-156045 A | 5/2003 |
| JP | 2003-156046 A | 5/2003 |
| JP | 2004-308883 A | 11/2004 |
| KR | 1020050108427 | 11/2005 |

OTHER PUBLICATIONS

GB Search report, dated Oct. 7, 2014. In corresponding application No. GB14051981.
Korean Notification of Reason(s) for Refusal of Korean Application No. 10-2014-0017618 mailed Apr. 17, 2015 and English translation.
George, et al., Oxidation of Bismuth Films in Air and Superheated Steam, Thin Solid Films, 1986, pp. 255-264, vol. 144.
Godbole, et al., Oxidation Inhibition in Bismuth Films Bombarded with Nitrogen Ions, Thin Solid Films, 1984, pp. 219-225, vol. 111.

* cited by examiner

| | | OXIDE LAYER | | OVERLAY | | | SEIZURE TEST RESULT (MPa) |
|---|---|---|---|---|---|---|---|
| | NO. | CONCENTRATION | MAIN ORIENTATION PLANE | COMPOSITION | MAIN ORIENTATION PLANE | ORIENTATION INTENSITY RATIO (%) | |
| EXAMPLES | 1 | 0.6 | 220 | Bi | 012 | 61 | 90 |
| | 2 | 7.8 | 220 | Bi | 202 | 55 | 95 |
| | 3 | 2.0 | 220 | Bi | 202 | 59 | 100 |
| | 4 | 1.9 | 220 | Bi-3Sn | 202 | 70 | 90 |
| | 5 | 4.2 | 220 | Bi | 202 | 38 | 95 |
| | 6 | 5.8 | 220 | Bi | 012 | 76 | 95 |
| | 7 | 3.5 | 221 | Bi-3In | 202 | 66 | 95 |
| | 8 | 5.0 | 222 | Bi | 202 | 60 | 95 |
| COMPARATIVE EXAMPLES | 9 | 0.3 | 220 | Bi | 202 | 60 | 65 |
| | 10 | 8.5 | 220 | Bi | 012 | 62 | 60 |

FIG.2

SLIDE MEMBER AND METHOD OF MANUFACTURING SLIDE MEMBER

CROSS-REFERENCE TO RELATED APPLICATION(S)

This application is based upon and claims the benefit of priority from Japanese Patent Application No. 2013-061950, filed on, Mar. 25, 2013 the entire contents of which are incorporated herein by reference.

FIELD

The present invention relates to a slide member having a Bi-based overlay provided over a substrate and a method of manufacturing such slide member.

BACKGROUND

A slide member such as a slide bearing used for example in an automobile engine is provided with an overlay for improving fatigue resistance and seizure resistance. The overlay is provided over a bearing alloy layer made for example of materials such as a copper alloy which is in turn provided over a metal back. A soft Pb alloy was conventionally used as the overlay. However, due to its heavy environmental load, replacement of Pb with Bi or Bi alloy is being suggested in recent years. Because Bi is relatively brittle, various countermeasures have been conceived to overcome such brittleness.

For instance, JP H11-50296 A discloses improving the sliding properties by adding one or more types of elements from Sn, In, and Ag to an overlay composed of Bi. JP 2003-156046 A discloses improving the wear resistance by adding hard particles such as borides, silicides, oxides, nitrides, etc. of metals to an overlay employing Bi or Bi alloy. JP 2001-20955 A and JP 2004-308883 A disclose improving the sliding properties by controlling the crystal plane of Bi constituting the overlay to a specific orientation. Further, JP 2003-156045 A discloses improving the fatigue resistance by controlling the density of precipitate particles of Bi constituting the overlay.

As described above, various ideas have been conceived for improving the sliding properties of slide members in which Pb used in the overlay is replaced by Bi-based (Bi or Bi alloy) materials. Attempts for further improvement of engine performance subjects slide members, assembled to components such as connecting rods, to further rigorous working environment. Thus, further improvement of sliding member performance, especially seizure resistance improvement, is required.

SUMMARY

It is thus, one object of the present invention to provide a slide member having a Bi-based overlay with further improved seizure resistance. It is another object of the present invention to provide a method of manufacturing a slide member suitable for manufacturing a slide member having outstanding seizure resistance.

Inventors of the present invention conducted diligent research in order to improve the sliding properties, seizure resistance in particular, of a slide member having an overlay composed of a Bi-based material. As a result, the inventors have conceived of the present invention by finding that seizure resistance can be improved by providing oxides, a bismuth oxide in particular, in a surface portion of an overlay composed of Bi in a scattered manner.

In one embodiment, the slide member includes a substrate; and an overlay including Bi or a Bi alloy provided over the substrate, wherein a surface portion of the overlay includes an oxide layer including a bismuth oxide, and wherein content of the bismuth oxide in the oxide layer represented by oxygen content is equal to or greater than 0.5 mass % and equal to or less than 8.0 mass %.

It is possible to suppress heat originating from friction with the counter element at the early stages of use of the slide member by providing an oxide layer including nonmetallic oxides, bismuth oxide in particular, in the surface portion of the overlay which serves as the slide surface of the slide member. This is believed to have enabled the improvement of seizure resistance. It is important for the bismuth oxide to exist only in the surface portion (surface-most portion) of the overlay. Fatigue resistance of the slide member may degrade by the presence of a hard oxide in the thickness-wise bulk interior of the overlay. This is because the crack propagates from the oxide. Such possibility of degradation in fatigue resistance can be eliminated by arranging the oxide to reside only in the surface portion (surface-most layer) of overlay 13.

Oxides are hard and thus excessive oxide content may adversely affect the slide member. Hence, bismuth oxide content in the oxide layer needs to be controlled to an appropriate amount. Good seizure resistance was achieved by controlling the bismuth oxide content to range from 0.5 mass % to 8.0 mass % represented by oxygen concentration. Conformability is degraded when bismuth oxide content is greater than 8.0 mass % and thus, the so called overlay fatigue occurs for example by local contact with the counter element. Good oil film cannot be formed under such conditions and thereby results in degradation of seizure resistance. It is not possible to suppress friction heat in the early stages of use of the slide member when the bismuth oxide content is less than 0.5 mass %. Even more preferably, content of bismuth oxide ranges from 2.0 mass % to 6.0 mass % represented by oxygen concentration.

In one embodiment, 95 area % or more of the oxide is preferably occupied by $Bi_2O_3$ within the observation field taken at the surface of the overlay. The bismuth oxide is prone to be dispersed granularly in the surface portion of the overlay as the bismuth content becomes smaller. The bismuth oxide is prone to assume a film structure as the bismuth content becomes greater. In one embodiment, concentration of oxygen can be obtained by capturing the element concentration of oxygen as an image from the surface of the overlay with the use of EPMA (Electron Probe Micro-Analyzer).

In the present embodiment, a substrate is a structure for providing the overlay. For example, a laminate of a metal back and a bearing alloy layer may be used as a substrate, in which case the overlay is provided over the bearing alloy layer. An intermediate layer serving as an adhesion layer may be provided between the bearing alloy layer and the overlay. In such case, the intermediate layer is also considered as a substrate along with the metal back and the bearing alloy layer. Further, the overlay may be provided directly over the metal back substrate. Materials such Al, Al alloy, Cu, and Cu alloy may be used as the bearing alloy layer. Materials such as Ag, Ag alloy, Ni, Ni alloy, Co, Co alloy, Cu, and Cu alloy may be used as the intermediate layer.

The overlay may be formed of pure Bi or Bi alloy. In one embodiment, the composition of the overlay, being primarily composed of Bi or Bi alloy, is substantially uniform throughout the overlay with the exception of the surface oxide layer. Examples of the Bi alloy include a Bi—Cu alloy, a Bi—Sn alloy, and a Bi—Sn—Cu alloy.

In one embodiment, the orientation intensity ratio of the main orientation plane of Bi or Bi alloy crystals in the overlay may be 50% or greater.

The crystal planes of Bi or Bi alloy may be represented by miller indices (h, k, l). The "h", "k", and "l" represent integers. For example, when the X-ray diffraction intensity of a crystal plane is identified as $R_{(h, k, l)}$, the orientation intensity ratio can be given by "Orientation intensity ratio (%)= $\{R_{(h, k, l)} \div \Sigma R_{(h, k, l)}\} \times 100(\%)$". In the equation, the numerator $R_{(h, k, l)}$ indicates the X-ray diffraction intensity of the surface for which the orientation intensity ratio is being obtained, and the denominator $\Sigma R_{(h, k, l)}$ indicates the sum of the X-ray diffraction intensities of each plane. The main orientation plane indicates the plane having the greatest orientation intensity ratio.

When the oxide layer of the present embodiment is provided in the surface portion of the overlay, the oxides remain in the surface portion not only during the early stages of use of the slide member but also after the wear of the overlay progresses. This is because the bismuth oxide residing in the surface portion sinks in the thickness direction of the overlay. Thus, the improvement in seizure resistance originating from the oxides can be obtained with continuity. The above described phenomenon is prone to occur as the orientation intensity ratio of the main orientation plane of Bi or Bi alloy increases. Orientation intensity ratio of 50% or more provides outstanding continuity of good seizure resistance. It is believed that the crystals exhibit better continuity as the orientation intensity ratio of the main orientation plane of the crystals constituting the overlay increases. As a result, it becomes easier for the oxides residing at the grain boundary to sink along the grain boundary with the progression of wear. Thus, oxides are not easily removed from the overlay.

Further in the present embodiment, sliding properties can be improved even more effectively when the main orientation plane of the bismuth oxide crystals in the oxide layer is either the (220) plane or the (201) plane.

According to experiments and research conducted by the inventors, bismuth oxide crystals in which the main orientation plane was the (220) plane or the (201) plane provided better sliding properties compared to when other planes were the main orientation plane. The mechanism behind the improvement in sliding properties is not sufficiently revealed at this point in time. However, the transformation capacity given by glide planes and twin planes and continuity with the overlay are some of the factors contributing to the improvement in the sliding properties. Further research is required to fully explain the mechanism.

The method of manufacturing the slide member of the present embodiment includes plating Bi or Bi alloy over the substrate to form the overlay; and oxidizing the overlay by: applying a water-soluble oil to a surface of the overlay and drying the surface of the overlay carrying the water-soluble oil, and thermally processing the overlay at a temperature ranging from 90 to 130 degrees Celsius for a duration ranging from 30 minutes to 2 hours to form a bismuth oxide in a surface portion of the overlay.

According to the method, bismuth oxide is produced in the oxidation step in which the surface portion of the overlay is oxidized. The content of oxide produced in the surface portion can be controlled by applying a water-soluble oil to the surface of the overlay and thermally processing the surface of the overlay. Thus, the above described slide member of the present embodiment having outstanding seizure resistance can be formed easily. It becomes difficult to form a slide member having outstanding seizure resistance when the thermal process is carried out without applying the water-soluble oil. This is because the speed of oxide formation is accelerated excessively and the target oxide content is easily surpassed.

BRIEF DESCRIPTION OF THE DRAWINGS

FIG. 2 is a chart indicating the configuration of the test samples and the results of the seizure resistance test.

DESCRIPTION

Figure 1:
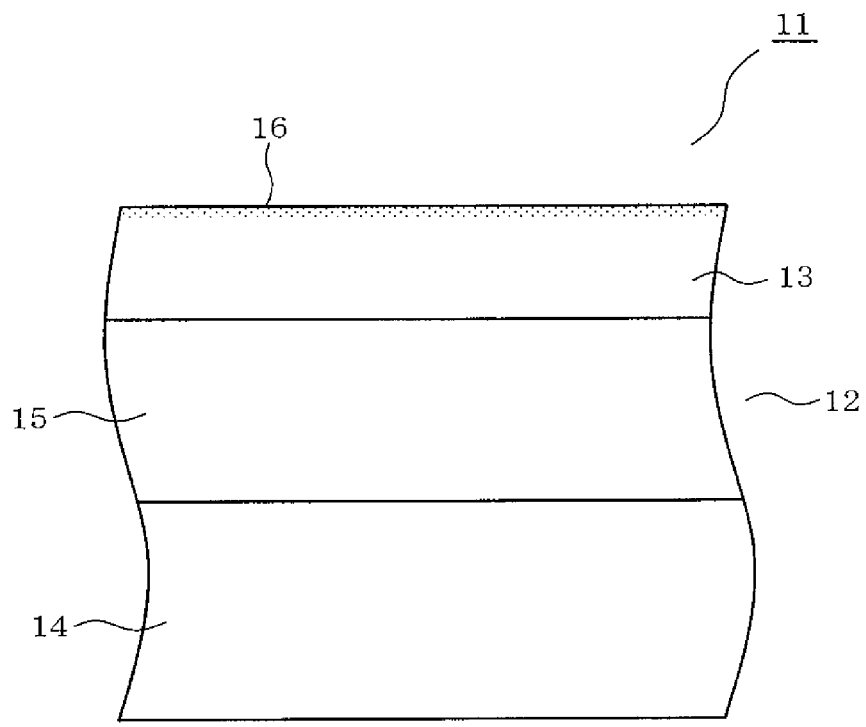
FIG. 1 illustrates one embodiment of the present invention and is a cross-sectional view schematically illustrating the structure of a slide member.

The present invention is described hereinafter with reference to the drawings through an embodiment of a slide bearing application used for example in a crankshaft of an automobile engine. EXAMPLES 1 to 8 indicated in the accompanying FIG. 2 are slide members (slide bearings) according to the present embodiment. Further, the slide members of EXAMPLES 1 to 8 are manufactured by the manufacturing method of the present embodiment.

FIG. 1 schematically illustrates the structure of slide member (slide bearing) 11 of the present embodiment. Slide member 11 is provided with overlay 13 composed of Bi or Bi alloy over substrate 12. Substrate 12 includes metal back 14 made of steel for example and bearing alloy layer 15 provided over the upper surface (sliding surface side) of metal back 14. Bearing alloy layer 15 is composed for example of Al, Al alloy, Cu, Cu alloy, or the like. An intermediate layer may be provided between bearing alloy layer 15 and overlay 13 in order to improve the bonding of bearing alloy layer 15 and overlay 13 and/or to prevent diffusion of atoms between the layers more effectively. Ag or Cu-5 mass % Zn may be employed as the intermediate layer.

In the surface portion (surface-most portion) of overlay 13, oxide layer 16 is provided which includes scattered bismuth oxide. Bismuth oxide content in oxide layer 16, represented by oxygen content, ranges from 0.5 mass % to 8.0 mass %. Oxide layer 16 of overlay 13 serves as the slide surface with which the counter element such as the crankshaft slides. The bismuth oxide is scattered in the slide surface so as not to concentrate at specific portions of the slide surface, especially at portions receiving high load.

The oxide concentration may be measured by EPMA. More specifically, the oxygen concentration of oxide layer 16 can be obtained by reading the concentration of the oxygen element as an image from the surface of overlay 13 using EPMA. In the present embodiment, EPMA is carried out under: voltage acceleration of 15.0 kv, irradiation current of $3 \times 10^{-8}$ A, crystallite of LEDI, and peak location of 110.083 mm and by using model JEOL-JXA8530F.

With the exception of EXAMPLE 5 later described, the main orientation plane of crystals of Bi or Bi alloy constituting overlay 13 of the present embodiment has an orientation intensity ratio of 50% or greater. In the present embodiment, the (202) plane and the (012) plane are the main orientation planes.

Further, with the exception of EXAMPLE 8 later described, the main orientation plane of crystals of bismuth oxide within oxide layer 16 of the present embodiment is either the (220) plane or the (201) plane. The main orientation plane and the orientation intensity ratio can be obtained by measuring the X-ray diffraction intensity from the surface of overlay 13 using XRD (X-ray diffraction apparatus).

Slide member 11 described above is manufactured by the following process flow. First, substrate 12 made of the so called bimetal is formed by lining a Cu-based or an Al-based bearing alloy layer 15 over metal back 14 made of steel. Substrate 12 formed of metal back 14 and bearing alloy layer 15 is molded into a semi-cylindrical or a cylindrical shape. The molded substrate 12 is surface finished by for example by boring or broaching the surface of bearing alloy layer 15. The surface-finished substrate 12 is surface cleaned by electrolytic degreasing and acid pickling.

Then, a plating process is carried out in which overlay 13 is formed over substrate 12 (bearing alloy layer 15) by plating Bi or Bi alloy in the thickness of 5 μm for example.

Then, oxidation process is carried out in which bismuth oxide is produced in the surface portion of overlay 13. The oxidation process begins with soaking overlay 13 in a water-soluble oil to attach the water-soluble oil on the surface of overlay 13. Overlay 13 is thereafter dried. In the present embodiment, a water-soluble cutting oil "UNISOLUBLE EM" of JX Nippon Oil & Energy Corporation is used as water-soluble oil.

Then, the surface of overlay 13 is thermally processed for example at 110 degrees Celsius for 1 hour. The temperature of the thermal process may range from 90 to 130 degrees Celsius and the duration of the thermal process may range from 30 minutes to 2 hours. As a result, bismuth oxide is formed in the surface of overlay 13 to produce oxide layer 16. The temperature and conditions applied in the thermal process need to be varied depending upon material, concentration, or the like of the water-soluble oil. The amount of oxide (oxide concentration) increases as the temperature of the thermal process becomes higher and the duration of the thermal process becomes longer.

Slide member 11 of the EXAMPLES described above has overlay 13 provided with oxide layer 16 in its surface portion. Oxide layer 16 includes a bismuth oxide which is a nonmetallic material. As a result, it is possible to suppress heat originating from friction with the counter element at the early stages of use of the slide member which in turn enables improvement of seizure resistance. Good seizure resistance can be obtained especially by controlling the bismuth oxide content in oxide layer 16 to 0.5 mass % or greater and 8.0 mass % or less in oxygen concentration. Fatigue resistance of the slide member may degrade by the presence of the bismuth oxide in the thickness-wise bulk interior of overlay 13. This is because the crack propagates from the bismuth oxide. Such possibility of degradation in fatigue resistance can be eliminated by arranging the bismuth oxide to reside only in oxide layer 16 located in the surface-most layer of overlay 13.

The inventors conducted a seizure test for verifying the seizure resistance of slide member 11 of the present embodiment. As shown in FIG. 2, 10 types of samples including EXAMPLES 1 to 8 and COMPARATIVE EXAMPLES 9 and 10 were prepared for the seizure test. EXAMPLES 1 to 8 are examples of implementations of the present invention and COMPARATIVE EXAMPLES 9 and 10 were prepared for comparison. The samples are sized to an inner diameter of φ48 mm and a width of 18 mm. FIG. 2 shows, along with the test results, the configuration of EXAMPLES 1 to 8 and COMPARATIVE EXAMPLES 9 and 10 such as the oxygen concentration and the main orientation plane of the bismuth oxide crystal in the oxide layer; and the composition, the main orientation plane, and the orientation intensity ratio of the main orientation plane of the overlay.

In EXAMPLES 1 to 8, oxygen concentration of the oxide layer ranges from 0.5 mass % to 8.0 mass %. The duration of thermal process for COMPARATIVE EXAMPLES 9 and 10 are shortened or extended so that their oxygen concentrations do not fall within the above described range. More specifically, the oxygen concentration of COMPARATIVE EXAMPLE 9 indicates 0.3 mass % being lower than the above described range and the oxygen concentration of COMPARATIVE EXAMPLE 10 indicates 8.5 mass % being higher than the above described range. The oxygen concentration of samples which were not subjected to thermal process indicated 0.2 mass %. In EXAMPLES 1 to 6 (and COMPARATIVE EXAMPLES 9 and 10), the main orientation plane of the bismuth oxide crystal was the (220) plane. In EXAMPLES 7 and 8, the main orientation planes of the bismuth oxide were the (201) plane and the (222) plane, respectively.

Regarding the overlay, EXAMPLE 4 is composed of Bi-3 mass % Sn alloy and EXAMPLE 7 is composed of Bi-3 mass % In alloy. The rest of the EXAMPLES and COMPARATIVE EXAMPLES 9 and 10 are composed of pure Bi. The thickness of the overlay is 5 μm throughout the samples. Further, the main orientation plane of the overlay was the (012) plane in EXAMPLES 1, 6, and COMPARATIVE EXAMPLE 10. The main orientation plane of the overlay was the (202) plane in the rest of EXAMPLES and in COMPARATIVE EXAMPLE 9. Still further, the orientation intensity ratio of the main orientation plane is relatively low at 38% only in EXAMPLE 5, whereas in the rest of EXAMPLES and COMPARATIVE EXAMPLES 9 and 10, the orientation intensity ratio of the main orientation plane was 50% or greater.

Seizure test was performed using a bearing performance tester for example. The test was conducted using S55C as the counter material at the velocity of 20 m/s, with 150 cc of lubricant, and with the specific load incremented by 0.5 MPa every 10 minutes. The test results are shown in FIG. 2. The specific load at which the rear surface temperatures of the samples exceeded 200 degrees Celsius or at which the drive belt of the shaft experienced slippage by sudden torque rise was deemed as the maximum load without seizuring.

The test results clearly show that the slide members of EXAMPLES 1 to 8 exhibit outstanding seizure resistance. The slide members of EXAMPLES 1 to 8 are each provided with an oxide layer in the surface portion of the overlay and the oxygen concentration of the oxide layer is controlled to be equal to or greater than 0.5 mass % and equal to or less than 8.0 mass %. The slide members of EXAMPLES 1 to 8 showed significant difference in seizure resistance as compared to COMPARATIVE EXAMPLES 9 and 10 in which the oxygen concentration do not fall within the above described range. This is believed to originate from failure in suppressing initial heat development when bismuth oxide content is less than 0.5 mass % represented by oxygen concentration (COMPARATIVE EXAMPLE 9). On the other hand, conformability is degraded when bismuth oxide content is greater than 8.0 mass % represented by oxygen concentration (COMPARATIVE EXAMPLE 10) and thus, the so called overlay fatigue occurs for example by local contact with the counter element. Good oil film cannot be formed under such conditions and thereby believed to result in degradation of seizure resistance.

Further look at the EXAMPLES show that EXAMPLES 4 and 7 in which the overlay is composed of Bi alloy has slightly less seizure resistance compared to EXAMPLES 1, 2, 3, 5, 6, and 8 in which the overlay is composed of pure Bi. It is thus, believed that overlay composed of pure Bi is preferable in terms of seizure resistance. It can be further seen that EXAMPLES 2, 3, 4, 5, 7, and 8, in which the (202) plane was the main orientation plane of the overlay crystal, tend to have greater seizure resistance compared to EXAMPLES 1 and 6 in which the (012) plane was the main orientation plane. The orientation intensity ratio of the main plane of the crystals of the overlay is preferably 50% or greater. However, EXAMPLE 5 in which the orientation intensity ratio was 38% achieved good seizure resistance.

The main orientation plane of the bismuth oxide crystal of the oxide layer is preferably the (220) plane or the (201) plane as was the case in EXAMPLES 1 to 7. However, EXAMPLE 8 in which the main orientation plane was the (222) plane also achieved good seizure resistance. Among EXAMPLES 1 to 8, the composition of EXAMPLE 3 showed the best results. As shown, the oxygen concentration of the oxide layer in EXAMPLE 3 was 2.0 mass % and the main orientation plane of the bismuth oxide crystal was the (220) plane. The overlay of EXAMPLE 3 was composed of pure Bi and the main orientation plane of the pure Bi crystal was the (202) plane. The orientation intensity ratio of the (202) plane was 59%.

Though not shown in FIG. 2, the inventors of the present invention conducted a similar test based on two more types of samples in addition to EXAMPLES 1 to 8. The additional samples were prepared based on the structure of EXAMPLE 3 and are each provided with an intermediate layer between the bearing alloy layer and the overlay. Two different types of intermediate layers were prepared, one of which being composed of Ag and the other being composed of Cu-5 mass % Zn. Both intermediate layers were formed in the thickness of 5 μm. The two additional samples provided with the intermediate layer also achieved good test results similar to EXAMPLE 3. The inventors further conducted a similar test based on two more types of samples. The additional samples were prepared based on the structure of EXAMPLE 3 and are each provided with a thicker overlay compared to EXAMPLE 3, the thicknesses being 10 μm and 20 μm respectively. These two additional samples also achieved good test results similar to EXAMPLE 3. In summary, seizure resistance hardly varies by the presence/absence of the intermediate layer and by the difference in the thickness of the overlay.

The slide member of the present invention is not limited to the embodiments (EXAMPLES) described above. Various aspects of the present invention may be modified such as the material and/or the thickness of the metal back and/or the bearing alloy layer, the method of forming the oxide layer, or the like. Each of the components of the slide member may include unavoidable impurities. The slide member is not limited to a slide bearing application for automobile engines but may be used in various other applications.

The foregoing description and drawings are merely illustrative of the principles of the present invention and are not to be construed in a limited sense. Various changes and modifications will become apparent to those of ordinary skill in the art. All such changes and modifications are seen to fall within the scope of the invention as defined by the appended claims.

DESCRIPTION OF REFERENCE SYMBOLS

In the drawings, 11 represents a slide member; 12, a substrate; 13, an overlay; and 16, an oxide layer.

What is claimed is:

1. A slide member comprising:
    a substrate; and
    an overlay including Bi or a Bi alloy provided over the substrate,
    wherein a surface portion of the overlay includes an oxide layer including a bismuth oxide,
    wherein, in the oxide layer, the mass of oxygen provided by the bismuth oxide is equal to or greater than 0.5% mass % and equal to or less than 8.0 mass % of the total mass of the oxide layer, and
    wherein a main orientation plane of bismuth oxide crystals in the oxide layer is either a (220) plane or a (201) plane.

2. The slide member according to claim 1, wherein an orientation intensity ratio of a main orientation plane of Bi or Bi alloy crystals in the overlay is 50% or greater.

3. A method of manufacturing the slide member according to claim 1, comprising:
    plating Bi or Bi alloy over the substrate to form the overlay; and
    oxidizing the overlay by:
        applying a water-soluble oil to a surface of the overlay and drying the surface of the overlay carrying the water-soluble oil, and
        thermally processing the overlay at a temperature ranging from 90 to 130 degrees Celsius for a duration ranging from 30 minutes to 2 hours to form a bismuth oxide in a surface portion of the overlay.

* * * * *